US012750378B2

(12) United States Patent
Hammerschmidt

(10) Patent No.: US 12,750,378 B2

(45) Date of Patent: Sep. 29, 2026

(54) REDUNDANT TRANSMISSION OF A PROTECTED DIGITAL AND AN ANALOG MEASUREMENT SIGNAL

(71) Applicant: Infineon Technologies AG, Neubiberg (DE)

(72) Inventor: Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 514 days.

(21) Appl. No.: 18/194,024

(22) Filed: Mar. 31, 2023

(65) Prior Publication Data

US 2023/0328073 A1 Oct. 12, 2023

(30) Foreign Application Priority Data

Apr. 4, 2022 (DE) ......................... 102022107969.4

(51) Int. Cl.
*H04L 9/40* (2022.01)

(52) U.S. Cl.
CPC ........ *H04L 63/123* (2013.01); *H04L 63/0428* (2013.01); *H04L 63/18* (2013.01)

(58) Field of Classification Search
CPC .... H04L 63/0428; H04L 63/123; H04L 63/18
See application file for complete search history.

(56) References Cited

U.S. PATENT DOCUMENTS

| | | | | |
|---|---|---|---|---|
| 5,508,910 | A * | 4/1996 | Diehl | G06F 11/0757 714/6.32 |
| 10,594,301 | B1 * | 3/2020 | Heidary Shalmany | H03K 3/011 |
| 2006/0018388 | A1 * | 1/2006 | Chan | H04L 25/085 375/257 |
| 2007/0090977 | A1 * | 4/2007 | Godin | H04J 3/047 341/68 |
| 2008/0256381 | A1 * | 10/2008 | Jacobowitz | H03L 7/1976 713/501 |
| 2009/0146806 | A1 * | 6/2009 | Jensen | G09F 3/0294 340/540 |
| 2013/0236011 | A1 * | 9/2013 | Schwarze | H04L 63/0428 380/255 |
| 2018/0365974 | A1 * | 12/2018 | Haas | G01R 33/07 |
| 2019/0069781 | A1 * | 3/2019 | Kim | A61B 5/1118 |
| 2020/0116685 | A1 * | 4/2020 | Wei | H04L 67/12 |
| 2020/0134550 | A1 * | 4/2020 | Barrenscheen | H04Q 9/02 |
| 2021/0232524 | A1 * | 7/2021 | Hopkins | G05B 19/042 |

FOREIGN PATENT DOCUMENTS

DE 102010039845 A1 3/2012

* cited by examiner

*Primary Examiner* — Daniel B Potratz
*Assistant Examiner* — Matthias Habtegeorgis
(74) *Attorney, Agent, or Firm* — Harrity & Harrity, LLP

(57) ABSTRACT

A sensor device, having a sensor apparatus configured to measure a measurement parameter in order to obtain a measurement result, a transmission apparatus for transmitting an analog signal indicative of the measurement result and a digital signal indicative of at least part of the same measurement result to an evaluation device, and a protection apparatus for protecting the digital signal prior to transmission.

26 Claims, 2 Drawing Sheets

REDUNDANT TRANSMISSION OF A PROTECTED DIGITAL AND AN ANALOG MEASUREMENT SIGNAL

CROSS REFERENCE TO RELATED APPLICATION

This application claims priority to German Patent Application No. 102022107969.4 filed on Apr. 4, 2022, the content of which is incorporated by reference herein in its entirety.

TECHNICAL FIELD

Various implementations relate in general to a sensor device, to an evaluation device, to a system and to a method for inspecting an authenticity of a transmitted measurement result.

BACKGROUND

A measurement result captured by a sensor may be transmitted to a receiver in the form of an analog signal. As an alternative, such an electrical signal may be transmitted digitally to a receiver.

SUMMARY

There could be a need to provide a sensor device with a simple design, fast operation, and high reliability.

According to one example implementation, what is provided is a sensor device that has a sensor apparatus configured to measure a measurement parameter in order to obtain a measurement result. The sensor device may furthermore have a transmission apparatus for transmitting an analog signal indicative of the measurement result and a digital signal indicative of at least part of the same measurement result to an evaluation device. The sensor device may furthermore have a protection apparatus for protecting the digital signal prior to transmission.

According to another example implementation, provision is made for an evaluation device that has a reception apparatus for receiving an analog signal indicative of a measurement result of a measured measurement parameter and a protected digital signal indicative of the same measurement result from a sensor device. The evaluation device may furthermore have a determination apparatus for determining authenticity information indicative of the authenticity of the measurement result based on the transmitted analog signal and the transmitted protected digital signal.

According to one example implementation, provision is made for a system that has a sensor device having the features described above and an evaluation device coupled or able to be coupled so as to be capable of communicating with the sensor device and having the features described above.

According to another example implementation, what is provided is a method for inspecting the authenticity of a transmitted measurement result, wherein the method includes measuring a measurement parameter in order to obtain a measurement result, transmitting an analog signal indicative of the measurement result and a protected digital signal indicative of at least part of the same measurement result, and determining authenticity information indicative of the authenticity of the measurement result based on a comparison between the transmitted analog signal and the transmitted protected digital signal.

One example implementation provides a sensor apparatus that provides a measurement result indicative of a measurement parameter both as an analog signal and—redundantly—as a digital signal for transmission to an evaluation device. The redundant signal transmission both in analog and in digital form has advantages: First of all, transmitting a measurement result captured by a sensor as an analog signal makes it possible to implement the sensor device with low outlay and particularly fast signal transmission. The combination of such an analog signal with a digital signal that is at least partially congruent, identical or corresponding with regard to the transmitted information content advantageously makes it possible to improve the security of the transmission of the sensor signal. This is because analog signals are susceptible to manipulations during transmission thereof to an evaluation device. By way of example, an unauthorized entity may intercept or tap off an analog signal during transmission thereof to an evaluation device and forward it to the evaluation device in manipulated form. If the evaluation device uses such a manipulated analog signal, for example for control purposes, this may lead to safety being considerably jeopardized. If for example an analog current signal captured by a sensor in an electric vehicle is transmitted to a motor controller and manipulated in the process, the control of the electric vehicle may be interfered with in a targeted manner and the safety of passengers of the electric vehicle may thereby be jeopardized. In order to avoid or at least to reliably recognize such manipulation of an analog sensor signal, the analog sensor signal is transmitted to the evaluation device at least partially redundantly as a digital signal. A comparison may then take place at the evaluation device as to whether the information contained in the digital signal matches or is compatible with the information contained in the analog signal. This is not the case in the event of a manipulation, whereas there is compatibility or a match when signal integrity is present. In this case, example implementations made use of the fact that digital signals are able to be (completely or at least partially) encrypted or provided with authentication codes (for example MAC) and are therefore considerably more difficult to manipulate than analog signals. Manipulations are thus able to be recognized quickly and in a manner robust against faults. Any countermeasures are able to be taken promptly if necessary.

According to one example implementation, it is possible to check not only the parity or sufficient similarity between analog signal and digital signal, but rather in particular to introduce protection, for example provided by a cyber security measure, for the digital signal. This may be provided for example by encrypting the entire message or adding a signature or a message authentication code (MAC). This makes it extremely difficult for an attacker to manipulate the digital message. Transmitted measurement signals may be authenticated by checking whether the analog signals actually used for the application match the secure digital signals.

Aspects

Within the scope of this application, the term “measurement parameter” may be understood to mean in particular a characteristic variable captured by a sensor, the value, temporal profile and/or properties of which may be captured by a sensor. Aspects of measurement parameters are an electric current, a temperature, a pressure, a magnetic field, etc.

Within the scope of this application, the term "measurement result" may be understood to mean in particular a value, a temporal profile and/or a property of a measurement parameter. By way of aspect, a measurement result may be a value of an electric current, a temporal profile of a temperature or the information as to whether a pressure is above or below a target pressure.

Within the scope of this application, the term "sensor apparatus" may be understood to mean in particular a technical sensor component or a sensor element, which is sensitive to a measurement parameter, of a component that is able to capture certain physical (for example electric current) or chemical (for example pH value) properties and/or the material composition of its environment in terms of quality or in terms of quantity. These variables may be captured by way of physical, chemical and/or biological effects and be converted into a—for example electrical or optical-signal that is able to be processed further.

Within the scope of this application, the term "transmission apparatus" may be understood to mean in particular an apparatus that is capable of communicating in a wireless and/or wired manner and that is configured to transmit a provided signal to an evaluation device that is coupled or able to be coupled so as to be capable of communicating.

Within the scope of this application, the term "analog signal" may be understood to mean in particular a signal form with a stepless and interruption-free profile. An analog signal may describe for example a temporally continuous profile of a measurement parameter. In contrast to a digital signal, an analog signal may have a stepless and/or arbitrarily fine profile. An analog signal may in particular adopt a theoretically infinite number of values in a dynamic range. By way of aspect, an analog signal may be provided as a voltage, electric current or electromagnetic wave (for example light signal or high-frequency signal).

Within the scope of this application, the term "digital signal" may be understood to mean in particular a signal that is represented by discrete values. By way of aspect, the discrete values of a digital signal may be a logic value "1" or a logic value "0". A digital signal may be formed for example from an analog signal that describes the temporally continuous profile of a measurement parameter. An analog signal may be converted into a digital signal for example by performing quantization or sampling at specific times. Digital signals may be coded as binary numbers. A quantization of a digital signal may be given in bits.

Within the scope of this application, the term "protected digital signal" may be understood to mean in particular a digital signal that is provided with protection (in particular privacy protection) against unauthorized manipulation prior to transmission. This protection may for example be encryption and/or addition of authentication data.

Within the scope of this application, the term "protection apparatus for protecting the digital signal" may be understood to mean in particular an entity that provides a digital signal, prior to transmission, with a security feature for protecting against unauthorized manipulation. Such protection may comprise for example encrypting or applying authentication data to the digital signal.

Within the scope of this application, the term "evaluation device" may be understood to mean in particular a device having communication resources and processor resources and that is configured to receive analog and digital signals and to extract information content concerning a measured measurement parameter therefrom.

Within the scope of this application, the term "reception apparatus" may be understood to mean in particular an entity of an evaluation device that may be coupled so as to be capable of communicating with a transmission apparatus of a sensor device in order to be able to receive both an analog signal and a digital signal therefrom. The reception apparatus and the transmission apparatus may communicate in accordance with a communication protocol for which both the reception apparatus and the transmission apparatus may be configured.

Within the scope of this application, the term "determination apparatus" may be understood to mean in particular a processor, a plurality of processors or part of a processor that is or are configured to evaluate provided analog and digital signals in order to obtain information about a measured measurement parameter and its authenticity therefrom.

Within the scope of this application, the term "authenticity information" may be understood to mean in particular information determined by the determination apparatus of the evaluation device as to whether or not the transmitted measurement result may be considered authentic. The authenticity information may be derived by evaluating the analog signal and its relationship with the digital signal. The digital signal may preferably contain features that allow its authenticity to be checked.

Additional aspect implementations of the sensor device, of the evaluation device, of the system and of the method are described below.

According to one aspect implementation, the sensor apparatus may have only a single common sensor unit for generating the analog signal and the digital signal. If one and the same sensor unit is used to generate both the analog signal and the digital signal, the sensor device may be configured in a particularly compact manner. The signal content of the analog signal and the signal content of the digital signal may furthermore then be identical or partially identical, which leads to particularly good comparability in order to determine a possible manipulation.

According to another aspect implementation, the sensor apparatus may have a first sensor unit for generating the analog signal and the digital signal and a separate second sensor unit for generating a further analog signal indicative of a further measurement result and a further digital signal indicative of at least part of the same further measurement result. Provision may thus be made in the sensor device for multiple sensor units, each of which is able to provide an analog signal and a digital signal containing the same sensor content.

According to one aspect implementation, the transmission apparatus may be configured to transmit the analog signal and the further analog signal via separate signal transmission paths. An attacker would then have to tap off both signal transmission paths for a manipulation. Transmitting different analog signals via different signal transmission paths, which may in particular be physically separate from one another, may therefore further improve security.

According to one aspect implementation, the transmission apparatus may be configured to transmit the digital signal and the further digital signal via a common digital signal transmission path. Since digital signals are considerably more difficult to manipulate than analog signals, the digital signals may be transmitted to the evaluation device via the same signal transmission path without a noteworthy loss of security. This allows a compact design of the system.

According to one aspect implementation, the transmission apparatus may be configured to transmit data sections of the digital signal and data sections of the further digital signal via the common digital signal transmission path in a temporally alternating manner. In order to be able to distinguish the digital signal from the further digital signal at the receiver, and therefore to be able to perform a correct and precise extraction of a measurement result for comparison with a corresponding analog signal, digital signal and further digital signal may be transmitted in alternating time slots or be transmitted by transmitting addresses assigned to the sensors together with the measurement data. As an alternative or in addition, digital signal and further digital signal may also be distinguished by using different frequencies or frequency bands and/or different data rates and/or different protocol variants. As an alternative or in addition, digital signal and further digital signal may be distinguished by using different codes.

According to one aspect implementation, the sensor apparatus may have a first sensor unit for generating the analog signal and a separate second sensor unit for generating the digital signal. In this aspect implementation too, the first sensor unit and the second sensor unit may record the same measurement result, for example detect the same current flowing through a busbar. It is additionally made possible to structurally separate the first sensor unit and the second sensor unit in order to transmit analog signal and digital signal. This structural separation may make it even more difficult for an unauthorized entity to perform signal manipulation.

According to one aspect implementation, the transmission apparatus may be configured to transmit the analog signal and the digital signal to the evaluation device via only a single common signal transmission path. Using a common signal transmission path, for example a common power line, for an analog signal and a digital signal at least partially identical thereto in terms of content leads to a compact design.

According to one aspect implementation, the transmission apparatus may be configured to transmit data sections of the analog signal and data sections of the digital signal via the single common signal transmission path by way of frequency multiplexing. In order to be able to distinguish the analog signal from the digital signal at the receiver and therefore to be able to perform a correct and precise extraction of a measurement result for comparison between analog signal and digital signal, analog signal and digital signal may for example be transmitted by frequency multiplexing.

According to one aspect implementation, the transmission apparatus may be configured to transmit the analog signal to the evaluation device via a first signal transmission path (for example via a first power cable) and to transmit the digital signal to the evaluation device via a separate second signal transmission path (for example via a second power cable that is provided separately from the first power cable). To perform the manipulation, an unauthorized entity would then have to tap off two signal transmission paths that are separate, in particular physically separate from one another, and additionally overcome the challenge of digital signals being difficult to manipulate. Operational safety is thereby able to be increased further using the described measure.

According to one aspect implementation, the transmission apparatus may be configured to transmit the analog signal as a single-ended analog signal. In asymmetric or single-ended signal transmission, an electric signal transmission may take place using a voltage that changes with respect to a reference potential. A shielded line (coaxial line) may in particular be used for such a signal transmission. Transmitting the analog signal as a single-ended analog signal allows a design of the sensor device with particularly low outlay.

As an alternative, the transmission apparatus may be configured to transmit the analog signal as a differential analog signal. Differential or symmetric signal transmission achieves a particularly high fault tolerance with respect to interfering influences, even over relatively long transmission paths. Differential signal transmission may be performed with a pair of identical signal lines. The actual signal may be transmitted on one signal line, and a reference signal known to the reception apparatus may be transmitted on the other signal line. The influencing of the signals by input coupling on the transmission path is substantially identical on both signal lines. Calculating the difference between the electrical potentials on both signal lines then fully or partially cancels out interfering influences. Using differential signal transmission may therefore further improve robustness against faults and the reliability of the system.

According to one aspect implementation, the transmission apparatus may be configured to transmit the digital signal with a lower data rate in comparison with the analog signal. The data rate may indicate how much information is transmitted in a specific time. By way of aspect, the data rate may be indicated in Mbit/s. For example, the data rate of the analog signal divided by the data rate of the digital signal may be at least 2, in particular at least 5, for example 10 or more. Reducing the data rate of the digital signal in comparison with the analog signal makes it possible to compensate for a transmission latency (that is to say a differing delay of analog signal or digital signal). The analog signal may be sampled less often for the comparison of the analog signal with the digital signal, in order to match the different data rates to one another at the receiver. It is also possible for the evaluation device to store the signal profile of the analog signal and of the digital signal and to take comparison values from a data memory used for this purpose. The actual transmission of the payload signals may take place using the analog signal. The digital signal may be used to inspect the integrity of the analog signal. For the inspection as to whether the analog signal has possibly been manipulated, according to the described implementation, it is possible to use a digital signal that is reduced in relation to the signal content of the analog signal and that represents only a subregion of the analog signal. This leads to a lower data rate when transmitting the digital signal. This makes it possible to reduce outlay when generating the digital signal, that is to say at the transmitter, and evaluating it, that is to say at the receiver.

According to one aspect implementation, the protection apparatus may be configured to at least partially encrypt the digital signal prior to transmission. If the digital signal is transmitted in fully or partially encrypted form, an attack on the digital signal for manipulation purposes is made more difficult. A manipulation then requires tapping off the analog signal, tapping off the digital signal and decrypting the digital signal and encrypting the manipulated digital signal again. It is extremely difficult or even impossible for an attacker to perform all these measures in combination, meaning that operational safety is able to be further increased by cryptographically encrypting the digital signal. A symmetric key or an asymmetric key may be used to encrypt the digital signal prior to transmission. By way of aspect, a key used to encrypt the digital signal may also be known to the evaluation device, which is therefore able to inspect the trustworthiness of the transmitted data based on this key. For example, such a key may be stored in a non-volatile memory (preferably in a protected area of such a memory) of the sensor device and in a non-volatile memory (preferably in a protected area of such a memory) of the evaluation device. At the receiver, the determination apparatus may be configured to decrypt a digital signal protected by way of an encryption.

As an alternative or in addition, the protection apparatus may be configured to provide the digital signal with authentication data prior to transmission. By way of aspect, digital data transmitted in cleartext may have a hash (for example a datum the computing of which is known) or a signature added to them when they are transmitted as authentication data. By way of aspect, such a hash may be generated using a secure algorithm. Based on authentication data, it is possible to inspect, at the receiver, whether the sensor device is able to be classified as trustworthy. At the receiver, the determination apparatus may be configured to authenticate a digital signal protected by way of authentication data.

According to one aspect implementation, the transmission apparatus may be configured to transmit the analog signal as a non-protected, in particular unencrypted, analog signal. For example, the analog signal may be transmitted in cleartext without previously being encrypted or being provided with authentication data. The comparison, at the receiver, of the analog signal with the digital signal at least partially redundant with respect thereto makes signal manipulation extremely difficult. Even if an attacker manipulates the analog signal, this circumstance is able to be recognized by comparing the digital signal with the analog signal, and so countermeasures are able to be taken promptly if necessary. Additional encryption outlay with regard to the analog signal or additional outlay in connection with the attachment of authentication data to an analog signal may therefore be dispensed with. It is thus possible to ensure a high degree of signal integrity with negligible outlay.

As an alternative, however, the analog signal may also be encrypted and/or provided with authentication data.

According to one aspect implementation, the sensor apparatus may have a current measurement apparatus. The sensor apparatus may in particular have an electronic component for measuring current that is able to generate sensor signals indicative of an electric current in an adjacent busbar. Such a sensor apparatus may in particular be a Hall sensor that is able to detect a Hall voltage in the presence of a magnetic field generated by the electric current to be measured, which Hall voltage is a measure of the electric current strength. Such a sensor apparatus may in particular be configured as a semiconductor component, more particularly as a semiconductor chip. As an alternative to a Hall sensor, other electronic components for measuring current are possible, for example current sensors using magnetoresistive effects, for instance giant magnetoresistive effect (GMR), anisotropic magnetoresistive effect (AMR) or tunnel magnetoresistive effect (TMR).

According to one aspect implementation, the sensor apparatus may have a signal processing apparatus for at least partially processing the analog signal and/or the digital signal prior to transmission by way of the transmission apparatus. The analog signal and/or the digital signal may already be subjected to signal pre-processing even at the sensor device. This may comprise for example a calibration, a compensation (for example a temperature compensation and/or a compensation of mechanical stress), a driver function and/or a signal conversion (for example a conversion between an analog signal and a digital signal in an analog-to-digital converter or a digital-to-analog converter).

According to one aspect implementation, the determination apparatus may be configured to determine the authenticity information based on a comparison of the transmitted analog signal with the transmitted digital signal. In order to determine the authenticity information, the data content of the analog signal (or of part thereof) may thus be compared with the data content of the digital signal. In the absence of any manipulation, identity or partial identity of the data content of the analog signal and of the data content of the digital signal may be assumed. If on the other hand a manipulation is present, analog signal and digital signal may deviate significantly from one another in terms of their data content.

According to one aspect implementation, the determination apparatus may be configured, in order to determine the authenticity information, to determine whether a deviation between the transmitted analog signal and the transmitted digital signal exceeds a predefinable tolerance threshold value. If data content of the digital signal deviates from data content of the analog signal by more than a predefinable threshold value (which may for example represent manufacturing tolerances, signal interference during transmission and the like), the transmitted data content and the associated analog signal may be classified as non-authentic. In the latter case, the presence of a manipulation or a functional impairment of the sensor apparatus may be assumed.

According to one aspect implementation, the determination apparatus may be configured to trigger an event depending on the determined authenticity information. By way of aspect, the triggered event may be outputting a warning or a fault signal, triggering an emergency mode with reduced performance, triggering operation using only the digital signal without considering the analog signal, increasing a data rate of the digital signal and/or classifying the measurement result as authentic or non-authentic. If the evaluation reveals that the signal content of analog signal and digital signal is considered to be authentic or non-authentic, a user of the system may be informed or alerted of this. By way of aspect, a driver of an electric vehicle may be informed, via a display device, that a sensor-based motor controller is not authentic. However, it is also possible to continue to operate the technical device (for example an electric vehicle) to which the sensor device and the evaluation device are assigned in a safe emergency mode upon recognizing possible manipulation or other insufficient signal integrity. For example, when signal manipulation is suspected, the electric vehicle may continue to be operated with reduced maximum permissible drive power, for example until its next service. As an alternative or in addition, the technical device (for example an electric vehicle) may be controlled solely based on the digital signal upon recognizing possible manipulation of the analog signal, which is more susceptible to manipulation. It is in particular possible, upon recognizing insufficient signal authenticity, to increase the data rate of the digital signal in order to be able to use the digital signal as payload signal with increased data rate instead of the potentially manipulated or defective analog signal.

According to one aspect implementation, the system may be configured as a motor controller. By way of aspect, the sensor device may then be configured to measure an electric current for operating an electric motor and the evaluation device may be configured as a control device for controlling the electric motor. If signal manipulation takes place in such an electric vehicle, this may lead to significant safety problems. By way of aspect, if a current signal is manipulated downward, the motor controller may increase the current, which additionally accelerates the electric vehicle. Such safety problems may be reliably rectified according to aspect implementations.

According to one aspect implementation, the evaluation device may be configured to use (in particular only) the analog signal to extract the measurement result and to use the digital signal (in particular only) to inspect the integrity of the analog signal. The evaluation device may in particular be configured to use the measurement result extracted from the analog signal (for example a value of the drive current captured by a sensor) for a system controller (for example for the motor controller of an electric motor). Preferably, only the analog signal is used to extract the measurement result and the digital signal is used only to inspect the integrity of the analog signal.

Aspects of usable digital interfaces for transmitting the digital signal are the SPC (Short Pulse Width Modulation Code) protocol, the PSI5 (Peripheral Sensor Interface 5) protocol, the DSI (Digital Serial Interface) protocol or the SPI (Serial Peripheral Interface) protocol.

BRIEF DESCRIPTION OF THE DRAWINGS

Example implementations are illustrated in the figures and are explained in more detail below.

In the figures.

DETAILED DESCRIPTION

Figure 1:
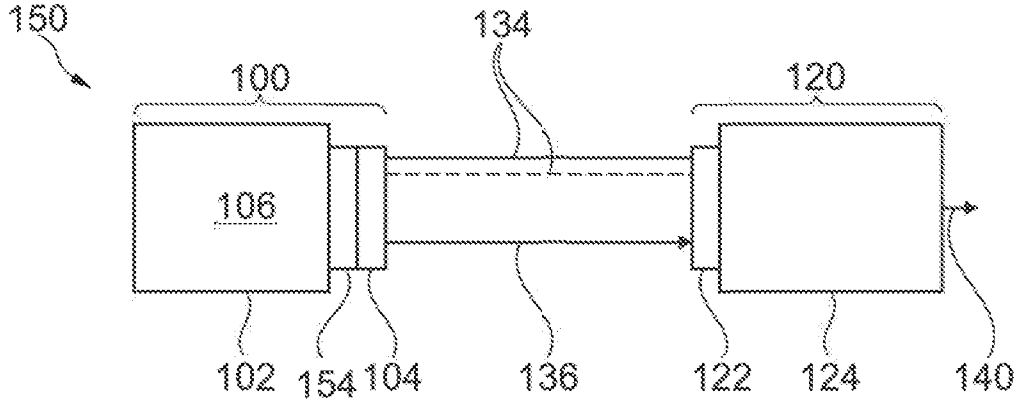
FIG. 1 shows a system having a sensor device and an evaluation device according to one example implementation.

Identical or similar components in different figures are provided with the same reference signs.

Before example implementations are described with reference to the figures, a few general points, based on which example implementations were developed, should also be explained:

According to one example implementation, in addition to an analog signal of a sensor apparatus for measuring a measurement parameter, a digital signal that is at least partially redundant or at least partially identical with regard to the signal content is generated. The analog signal makes it possible to transmit information about the measurement parameter to an evaluation device for further use (for example for controlling a technical system) with low outlay and with low transmission latency time. The digital signal bridges the security gap opened up by the analog signal, which is susceptible to manipulation. The analog signal may for example be classified as authentic only when the digital signal and the analog signal are sufficiently similar or congruent in terms of their signal content. This makes it possible to improve the operational safety of a sensor system with low outlay. Digital signals are considerably less susceptible to manipulation than analog signals. To manipulate a digital signal, it would have to be tapped off, manipulated and fed back. Such manipulation of a digital signal requires a high manipulation time, meaning that possible manipulation is also able to be recognized through a time delay between analog signal and digital signal. A manipulation time needed to manipulate a digital signal may additionally be increased by transmitting the digital signal in encrypted form, since an attacker would then have to decrypt the digital signal before manipulating it. The sensor mechanism and protection mechanism according to example implementations is thus particularly suitable for time-critical processes, such as for example controlling an electric motor. According to one example implementation, it is possible to provide a secure sensor device with an analog sensor output. More precisely, such an example implementation provides improved safety protection in a system that contains one or more analog sensor apparatuses.

Analog interfaces for sensor applications are particularly advantageous when fast measurements are required and the distance between a sensor device (with a sensor) and a receiving evaluation device (in particular with a processor such as for example a microcontroller) is not excessively great. One example of such applications is current measurement for controlling an electric motor. First of all, analog sensors offer a low latency time or signal delay in comparison with sensors with digital serial interfaces. Second of all, an analog sensor signal may easily be connected to an input of an analog-to-digital converter of a microcontroller, which is available in simpler forms and in larger numbers in comparison with special digital sensor interfaces.

One conventional disadvantage of analog sensor architectures is the susceptibility of analog sensor signals to external manipulation. An attacker is able to modify the analog signal relatively easily without authorization, for example through voltage division, amplification and filtering. Such an attacker may even connect another signal source instead of the actual sensor. Using an analog signal alone therefore cannot provide reliable protection against this type of manipulation.

According to one example implementation, such security problems may be overcome by combining a fast analog sensor architecture with a digital interface. Providing the sensor apparatus with an analog interface ensures compatibility with conventional systems. A digital interface is additionally added in parallel to the analog interface and transmits the same signal or the same signal content, but in digital form. The digital signal may advantageously be transmitted with a reduced sampling rate that does not even have to be sufficient to meet requirements in terms of an application bandwidth. Very simple sensor interfaces, such as for example SENT (Single Edge Nibble Transmission), SPC (Short Pulse Width Modulation Code), PSI (Peripheral Sensor Interface), DSI (Digital Serial Interface), I2C (Inter-Integrated Circuit), SPI (Serial Peripheral Interface), UART (Universal Asynchronous Receiver/Transmitter), are therefore suitable as digital sensor interface according to example implementations. The signal on the digital channel may preferably be encrypted using an encryption method, such as for example SHA (Secure Hash Algorithm) or AES (Advanced Encryption Standard). The receiver decrypts the message and compares whether the received digital signal matches the received analog signal with sufficient accuracy. If this is not the case and the difference persists over a relatively long time, it is possible to identify manipulation or a permanent failure of the sensor.

The sensor signal may be processed within a sensor chip. At a specific location of the processing chain, the path to the analog output and to the digital interface may be separated. The digital signals may be encrypted. The correspondingly encrypted message may be transmitted via a digital interface. The separation point between the analog signal and the digital signal may be located at any point in the processing chain, and may be selected depending on an architecture of the signal processing path. It may be preferable to arrange the separation point as shortly as possible upstream of the analog output. In cases in which the internal processing is digital, the processing may advantageously take place upstream of a digital-to-analog converter that converts the signal back to an analog representation.

As an alternative to dividing the analog and digital signal at a desired position of the main signal path, it is also possible to form the digital path completely independently of the analog path and to measure the same signal using an additional sensor unit. Such an implementation has the advantage that the two signals are completely redundant and comparing them serves both cyber security purposes and functional security purposes at the same time. It is also possible to jointly use a digital security channel from multiple sensor units via a sensor bus. If, according to one example implementation, a system tolerates a data rate that is too low for the use of the application on the secure digital channel, the further reduction through the joint use of the bus is not a restriction.

A high-frequency transmission may also be implemented for the digital signal. A loss over a longer time period may then also be used to recognize a fault or a manipulation.

Cyber security is particularly important in particular for motor vehicle applications. The secure sensor apparatus may therefore advantageously be configured as a motor vehicle sensor. Security solutions for sensors may be implemented in particular for ABS (anti-lock braking system) sensors, steering torque sensors and steering angle sensors. Example implementations may be configured to be compatible with the ISO 21434 Automotive Cyber Security Standard.

According to one example implementation, in addition to analog transmission of a sensor signal, redundant digital communication of a corresponding digital signal may thus be implemented. The digital signal may be decrypted at the receiver. The received analog signal may furthermore be compared with the received digital signal at the receiver, for example by way of a microcontroller at the receiver.

FIG. 1 shows a system 150 having a sensor device 100 and an evaluation device 120 according to one example implementation.

The illustrated system 150 therefore has the sensor device 100 capable of communicating and the evaluation device 120 capable of communicating and coupled to the sensor device 100 in order to exchange signals. By way of example, the sensor device 100 may have a current sensor for capturing an operating current for an electric motor. The evaluation device 120 may accordingly for example have a motor control apparatus for controlling the electric motor. An output signal from the evaluation device 120 may therefore be supplied to an electric motor, not illustrated, via a signal interface 140. However, other applications, in particular other motor vehicle applications, are possible.

Transmission paths 134, 136 used to transmit signals from the sensor device 100 to the evaluation device 120 may be configured in a wired (for example configured as a power cable) or wireless (for example as an optical wireless path or high-frequency wireless path) manner.

The sensor device 100 shown in FIG. 1 has a sensor apparatus 102 configured to measure a measurement parameter in order to obtain a measurement result. The measurement parameter may for example be an electric current, and the measurement result may be a value of this electric current captured by a sensor of the sensor apparatus 102. According to FIG. 1, the sensor apparatus 102 has only a single common sensor unit 106 for generating the analog signal and the digital signal. By way of example, the sensor unit 106 may be a single Hall sensor or another type of magnetic sensor for magnetically detecting a current flowing through a busbar. For example, the sensor unit 106 may include a magnetic sensor and associated circuitry (e.g., signal processing apparatus 138) configured to generate the analog signal and the digital signal. The associated circuitry may include an analog-to-digital converter that is used to convert the analog signal into the digital signal indicative of the same measurement result.

The sensor device 100 furthermore contains a transmission apparatus 104, functionally coupled to the sensor apparatus 102, for transmitting an analog signal indicative of the measurement result and a digital signal indicative of the same measurement result as its analog counterpart to a reception apparatus 122 of the evaluation device 120. In other words, the transmission apparatus 104 may transmit the detected sensor signal to the reception apparatus 122 both as an analog signal and as a digital signal redundant with respect thereto. The analog signal and the digital signal may thus fully or partially contain identical signal content, once in analog form and once in digital form.

As shown in FIG. 1, the transmission apparatus 104 may be configured to transmit the analog signal to the evaluation device 120 via a first signal transmission path 134 and to transmit the digital signal to the evaluation device 120 via a separate second signal transmission path 136 physically separate from the first signal transmission path. An attacker, in order to manipulate the sensor signals, would therefore have to attack two physically separate signal transmission paths 134, 136 and correlate the transmitted signals. This is difficult, and so the described measure leads to further increased security.

By way of example, the transmission apparatus 104 may be configured to transmit the analog signal as a single-ended analog signal. This makes it possible to achieve a particularly simple configuration of the system 150. As an alternative, the transmission apparatus 104 may be configured to transmit the analog signal as a differential analog signal. This makes it possible to ensure particularly interference-free signal transmission.

The transmission apparatus 104 may particularly advantageously be configured to transmit the digital signal with a digital data rate that may be reduced in comparison with an analog data rate of the analog signal. By way of example, the data rate of the transmission of the digital signal may be lower than the data rate of the transmission of the analog signal by a factor of 10. A reduced data rate of the digital signal may be sufficient, since the digital signal according to FIG. 1 is used only for comparison with the analog signal in order to assess the authenticity thereof. The analog signal on the other hand may be provided with a higher data rate and for example be used as the sole source for determining the value of the measurement parameter (for example a current captured by a sensor). Transmitting the analog signal with a higher signal bandwidth and the digital signal with a lower data rate makes it possible to ensure both simple data transmission and high accuracy when measuring the measurement parameter.

The link between the signal bandwidth of the analog signal and the data rate of the digital signal is given for example by the sampling rate in accordance with the Nyquist criterion. The data rate of the digital interface may correspond at least to the number of bits per transmission of a protocol (including the start and stop bits) times the sampling rate.

The sensor device 100 may furthermore preferably be configured to encrypt the digital signal and to transmit the encrypted digital signal to the reception apparatus 122. To this end, the sensor device 100 has a protection apparatus 154 for protecting the digital signal prior to transmission. The reception apparatus 122 or the determination apparatus 124 may then decrypt the encrypted digital signal before comparison with the analog signal, for example using a key stored at the receiver. The encrypted communication of the digital signal means that it is therefore first necessary to decrypt the digital signal in order to perform unauthorized manipulation of the sensor signals. For this purpose, an unauthorized entity requires a secret key that is not available thereto. Encrypting the digital signal thereby makes it possible to further improve data security and robustness against faults. On the other hand, the transmission apparatus 104 may be configured to transmit the analog signal as an unencrypted analog signal, that is to say without previous encryption by the sensor device 100. This enables fast transmission of the analog sensor signal. Encrypting the redundant digital signal makes it possible to achieve a high degree of security even with an unencrypted analog signal, since the decrypted digital signal is compared with the analog signal at the receiver in order to inspect the authenticity of the received sensor signals.

As an alternative or in addition, it is also possible for the protection apparatus 154 to provide the digital signal with authentication data, for example with a hash, before it is transmitted. The digital signal may then be transmitted in cleartext, wherein the authenticity of the digital signal is able to be inspected at the receiver based on the authentication data.

The evaluation device 120 has the reception apparatus 122 that has already been discussed, this being configured to receive the analog signal and the digital signal from the transmission apparatus 104 of the control device 100.

A determination apparatus 124, functionally coupled to the reception apparatus 122, of the evaluation device 120 obtains the received analog signal and the received digital signal for further processing. More precisely, the determination apparatus 124 determines, through a comparison of the analog signal with the digital signal, authentication information indicative of the authenticity of the measurement result. This may indicate for example whether the analog signal was manipulated or modified by an unauthorized entity when it was transmitted or whether sensor integrity is not present due to a discrepancy between analog signal and digital signal. In order to determine the authenticity information, the determination apparatus 124 may compare the transmitted analog signal with the transmitted digital signal after the digital signal has been decrypted beforehand in the evaluation device 120. If the digital signal is transmitted with a lower data rate than the analog signal, signal sampling may be performed before the comparison in order to compare mutually corresponding signal elements of the digital signal with associated signal elements of the analog signal. In order to determine the authenticity information, the determination apparatus 124 may determine whether a deviation between the transmitted analog signal and the transmitted digital signal exceeds a predefinable tolerance threshold value. By way of example, the tolerance threshold value may be selected such that possible manipulation or other lack of integrity of the sensor data is assumed only in the event of deviations between analog signal and digital signal of more than 5%, in particular of more than 10%. In order to determine a deviation, a predefined number of data points of the analog signal and of the digital signal may be compared with one another. In this comparison, a difference between analog signal and digital signal with respect to the analog signal may be calculated on average over these data points. Deviations that are lower in comparison with the predefined tolerance threshold value may be ascribed to unavoidable and tolerable interference during data transmission, component tolerances, etc. Performing threshold value analysis when determining the authenticity information makes it possible in particular to avoid false-positive identifications of lack of authenticity.

The determination apparatus 124 may be furthermore be configured to trigger an event depending on the determined authenticity information. A triggered event may be for example outputting a warning to a user, for example the display "motor controller unreliable!". As an alternative or in addition, an emergency mode with reduced performance or power may be triggered, for example a motor controller of an electric vehicle may be supplied with lower power until the electric vehicle has been taken to a maintenance center. It is also possible, upon recognizing manipulation of the analog signal, to carry out further operation using only the digital signal (that is to say not the analog signal suspected to have been manipulated). It may be advantageous here, during the temporary use of only the digital signal as payload or control signal, to temporarily increase the data rate thereof. The digital signal may then be used not only to inspect the integrity of the analog signal, but also as a basis for controlling the system.

In summary, according to FIG. 1, an analog interface and a digital interface of the sensor device 100 transmit the same signal to the evaluation device 120. The digital signal transmission may take place in at least partially encrypted form. The analog interface may be selectively provided as single-ended or differential. A sensor signal may thereby be transmitted with a bandwidth sufficient for an application. The digital interface may in this case tolerate an insufficient data rate or latency time.

Figure 2:
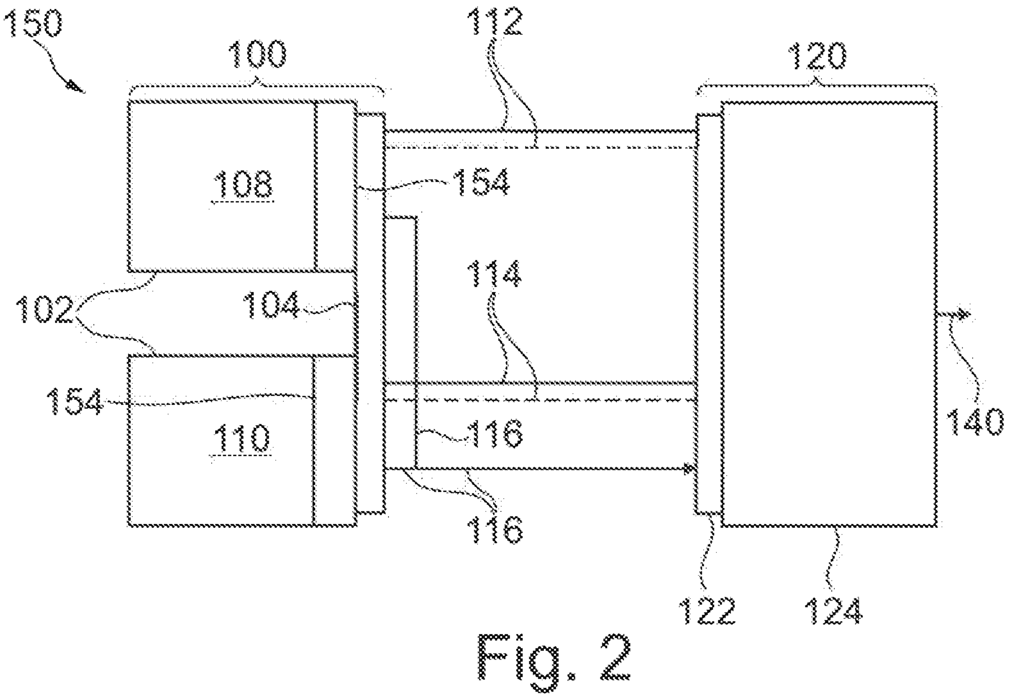
FIG. 2 shows a system having a sensor device and an evaluation device according to another example implementation.

FIG. 2 shows a system 150 having a sensor device 100 and an evaluation device 120 according to another example implementation.

The differences between the example implementation according to FIG. 2 and the example implementation according to FIG. 1 are described below. According to FIG. 2, the sensor apparatus 102 has not just a single sensor unit 106. Instead, according to FIG. 2, provision is made for a first sensor unit 108 (for example a first Hall probe) for generating the analog signal and the digital signal and also a separate second sensor unit 110 (for example a second Hall probe) for generating a further analog signal indicative of a further measurement result and a further digital signal indicative of at least part of the same further measurement result. For example, each sensor unit 108 and 110 may include a magnetic sensor and associated circuitry (e.g., signal processing apparatus 138) configured to generate an analog signal and a corresponding digital signal. Each associated circuitry may include an analog-to-digital converter that is used to convert the analog signal into the digital signal indicative of the same measurement result. Furthermore, according to FIG. 2, the transmission apparatus 104 is configured to transmit the analog signal and the further analog signal via separate signal transmission paths 112, 114. The analog signal is thus transmitted via the signal transmission path 112, whereas the further analog signal is transmitted via the signal transmission path 114. An attacker then has to attack two physically separate signal transmission paths 112, 114 in order to manipulate the analog signals. This additionally increases data security. FIG. 2 furthermore shows that the transmission apparatus 104 is configured to transmit the digital signal and the further digital signal via a common digital signal transmission path 116. Overall, according to FIG. 2, three separate signal transmission paths 112, 114, 116 are thus provided. Since the (preferably encrypted) digital signals are difficult to manipulate in any case, transmitting the digital signals via a common signal transmission path 116 does not lead to any noteworthy reduction in data security, but reduces the complexity of the system 150. Due to the reduced digital data rate in comparison with the data rate of the analog signal, a single digital bus, which transmits digital signal packets of the two sensor units 108, 110 alternately, may be sufficient. In order to make the digital signal distinguishable from the further digital signal at the receiver, the transmission apparatus 104 may be configured to transmit data sections of the digital signal and data sections of the further digital signal via the common digital signal transmission path 116 in a temporally alternating manner.

Figure 3:
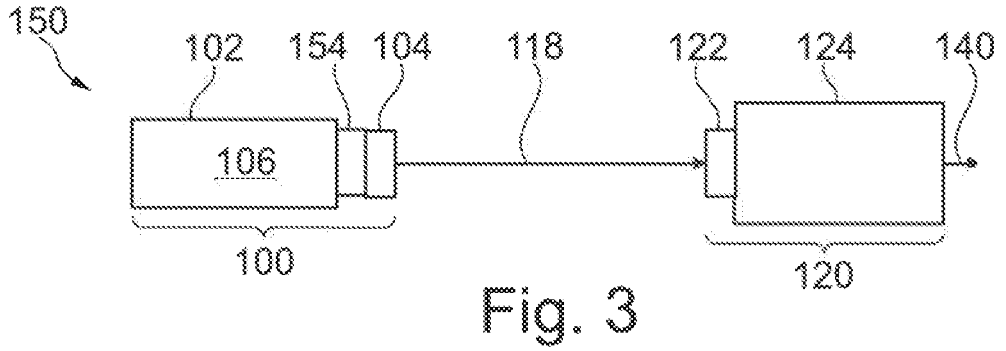
FIG. 3 shows a system having a sensor device and an evaluation device according to yet another example implementation.

FIG. 3 shows a system 150 having a sensor device 100 and an evaluation device 120 according to yet another example implementation.

The example implementation according to FIG. 3 differs from the example implementation according to FIG. 1 substantially in that, according to FIG. 3, the transmission apparatus 104 is configured to transmit the analog signal and the digital signal to the evaluation device 120 via only a single common signal transmission path 118. In this case, the transmission apparatus 104 may be configured to transmit data sections of the analog signal and data sections of the digital signal via the single common signal transmission path 118 using a frequency multiplexing method in order to make it possible to distinguish between digital and analog data sections at the receiver. Advantageously, it is possible to combine the analog and digital transmission by way of frequency multiplexing. It is possible for example to use a baseband up to a bandwidth of the signal and then an overlaid digital transmission outside the frequencies of the analog payload signal, for example by modulating to a carrier frequency or by using a zero-mean code with a sufficiently high symbol rate. This may be performed such that mixed products in baseband are low enough to be considered negligible in the analog signal.

Figure 4:
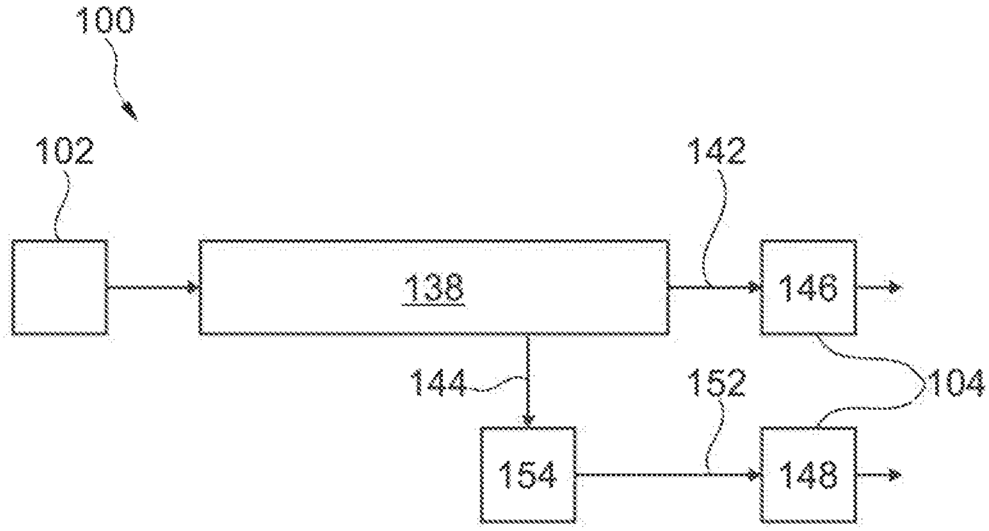
FIG. 4 shows a sensor device according to one example implementation.

FIG. 4 shows a detailed structure of a sensor device 100 according to one example implementation as may be used for example according to FIG. 1 to FIG. 3.

According to FIG. 4, the sensor apparatus 102 may provide sensor signals to a signal processing apparatus 138. The signal processing apparatus 138 may pre-process the provided sensor signals even before they are transmitted to the evaluation device 120 by way of the transmission apparatus 104. This pre-processing may for example comprise a calibration, a compensation for mechanical stress, a temperature compensation, an analog-to-digital conversion, a digital-to-analog conversion, etc. The exact functionality of the signal processing apparatus 138 depends on the respective application case.

At an output of the signal processing apparatus 138, the sensor signals may be split into an analog main signal 142 (also referred to as analog signal) and into a digital comparison signal 144 (also referred to as digital signal). The analog main signal 142 may be provided to an analog interface 146 of the transmission apparatus 104 for transmission to a reception apparatus 122, not illustrated in FIG. 4. The digital comparison signal 144 may first be supplied to a protection apparatus 154 that encrypts the digital comparison signal 144 by way of a cryptography algorithm before it is transmitted to the reception apparatus 122. The encrypted digital signal is then provided to a digital interface 148 of the transmission apparatus 104 for transmission to the reception apparatus 122.

The division between the analog signal and the digital signal may take place at any point in the signal path according to example implementations. However, it is preferable to perform the division or split in the signal path of the sensor device 100 as late as possible or as shortly as possible upstream of the signal transmission to the evaluation device 120. This ensures the greatest possible match between the signal content of the digital signal and the signal content of the analog signal. This measure also leads to a compact design of the sensor device 100, since the signal processing apparatus 138 (or at least part thereof) may then be used both for the analog signal and for the digital signal.

As illustrated in FIG. 4 with reference sign 152, a characteristic message authentication code (MAC) may be assigned to the encrypted digital signal. This may be used to obtain assurance about the origin of the data and to inspect its integrity.

Figure 5:
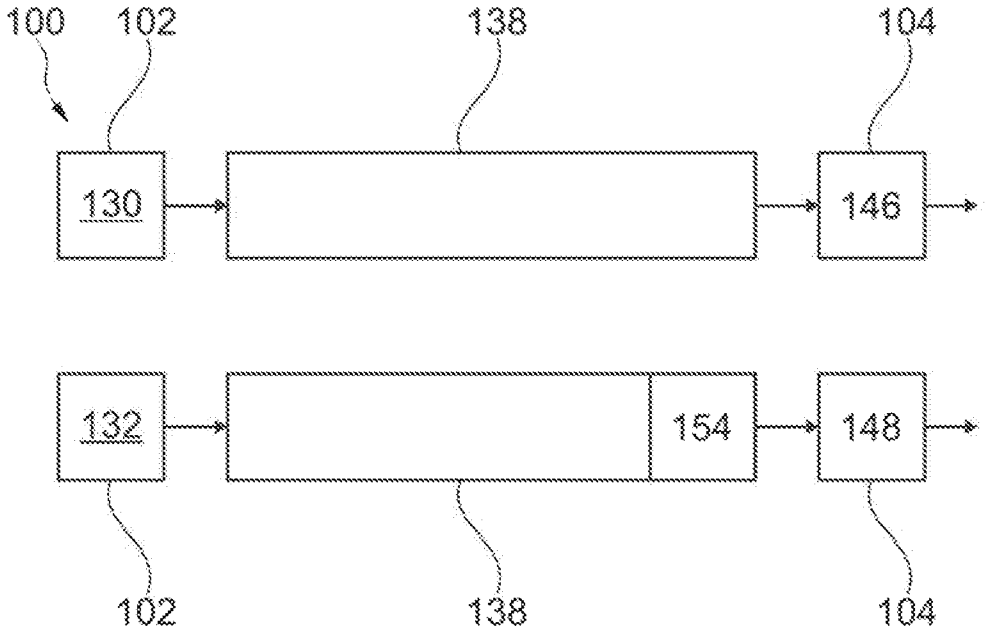
FIG. 5 shows a sensor device according to another example implementation.

FIG. 5 shows a sensor device 100 according to another example implementation that, apart from manipulation security, also guarantees functional security.

According to FIG. 5, the sensor apparatus 102 has a first sensor unit 130 (for example a first Hall probe) for generating the analog signal and a separate second sensor unit 132 (for example a second Hall probe) for generating the digital signal. The two sensor units 130, 132 may be two structurally identical sensors, one of which delivers an analog sensor signal and the other of which delivers a digital sensor signal. The sensor characteristic of the two structurally identical sensor units 130, 132 may be identical to within manufacturing tolerances. The analog signal provided by the sensor unit 130 is subjected to signal pre-processing in a signal processing apparatus 138. In a corresponding manner, the digital signal provided by the sensor unit 132 is subjected to signal pre-processing in a further (or the same) signal processing apparatus 138. The digital signal 138 may furthermore be encrypted in a protection apparatus 154. The analog signal is then transmitted to a reception apparatus 122, not illustrated in FIG. 5, via the analog interface 146 or the digital signal is transmitted to the reception apparatus via the digital interface 148.

The complete redundancy according to FIG. 5 is able, through a joint measure (namely the provision of the described sensor units 130, 132), to improve both the cyber security and the functional security of the sensor device 100. Cyber security is able to be improved since it is possible, by analyzing the digital signal, to recognize when the analog signal is manipulated. Operational safety is able to be improved since redundantly providing the sensor units 130, 132 makes it possible to recognize if one of the sensor units 130, 132 is damaged.

It is additionally pointed out that "having" does not rule out any other elements or steps, and "a" or "an" does not rule out a multiplicity. It is furthermore pointed out that features or steps that have been described with reference to one of the above example implementations may also be used in combination with other features or steps of other example implementations described above. Reference signs in the claims should not be considered restricting.

The invention claimed is:

1. A sensor system, comprising:

a sensor device comprising:

a first sensor unit comprising a first sensor configured to measure a measurement parameter in order to obtain a first measurement result, wherein the first sensor unit is configured to generate a first analog signal indicative of the first measurement result and generate a first digital signal indicative of at least part of the first measurement result;

a second sensor unit comprising a second sensor configured to measure the measurement parameter in order to obtain a second measurement result, wherein the second sensor unit is configured to generate a second analog signal indicative of the second measurement result and generate a second digital signal indicative of at least part of the second measurement result;

a transmission apparatus configured to transmit the first analog signal on a first signal transmission path to an evaluation device, transmit the second analog signal on a second signal transmission path, different from the first signal transmission path, to the evaluation device, and transmit the first digital signal and the second digital signal on a common digital signal transmission path to the evaluation device; and a protection apparatus, comprising a hardware processor, configured to protect the first digital signal and the second digital signal prior to transmission of the first digital signal and the second digital signal to the evaluation device.

2. The sensor system as claimed in claim 1, wherein the transmission apparatus is configured to transmit first data sections of the first digital signal and second data sections of the second digital signal via the common digital signal transmission path in a temporally alternating manner.

3. The sensor system as claimed in claim 1, wherein the transmission apparatus is configured to transmit the first analog signal and the second analog signal as a single-ended analog signal.

4. The sensor system as claimed in claim 1, wherein the transmission apparatus is configured to transmit the first analog signal and the second analog signal as a differential analog signal.

5. The sensor system as claimed in claim 1, wherein the transmission apparatus is configured to transmit the first digital signal with a lower data rate in comparison with a data rate of the first analog signal.

6. The sensor system as claimed in claim 1, wherein:

the protection apparatus is configured to at least partially encrypt the first digital signal and the second digital signal prior to transmission of the first digital signal and the second digital signal, or the protection apparatus is configured to provide the first digital signal and the second digital signal with respective authentication data prior to transmission of the first digital signal and the second digital signal.

7. The sensor system as claimed in claim 1, wherein the transmission apparatus is configured to transmit the first analog signal and the second analog signal as unprotected, unencrypted analog signals.

8. The sensor system as claimed in claim 1, wherein the sensor device is a current measurement apparatus configured to use the first sensor and the second sensor to measure a current.

9. The sensor system as claimed in claim 1, further comprising:

a signal processing apparatus configured to at least partially process the first analog signal prior to transmission of the first analog signal by way of the transmission apparatus, or at least partially process the first digital signal prior to transmission of the first digital signal by way of the transmission apparatus.

10. The sensor system as claimed in claim 1, wherein the first sensor and the second sensor are magnetic field sensors configured to measure a magnetic field, and wherein the first analog signal and the second analog signal are transmitted simultaneously.

11. The sensor system as claimed in claim 1, further comprising:

the evaluation device, the evaluation device comprising:

a reception apparatus configured to receive the first analog signal, the second analog signal, the first digital signal, and the second digital signal, wherein the first analog signal and the second analog signal are received simultaneously by the reception apparatus, and wherein the first digital signal and the second digital signal are received by the reception apparatus as protected digital signals; and a determination apparatus configured to determine first authenticity information indicative of an authenticity of the first measurement result based on the first analog signal and the first digital signal, and determine second authenticity information indicative of an authenticity of the second measurement result based on the second analog signal and the second digital signal.

12. The sensor system as claimed in claim 11, wherein the determination apparatus is configured to determine whether a deviation between the first analog signal and the first digital signal exceeds a first predefinable tolerance threshold value associated with possible manipulation as a basis of the first authenticity information, wherein the deviation between the first analog signal and the first digital signal exceeding the first predefinable tolerance threshold value is indicative of a lack of authenticity of the first analog signal, wherein the determination apparatus is configured to determine whether a deviation between the second analog signal and the second digital signal exceeds a second predefinable tolerance threshold value associated with possible manipulation as a basis of the second authenticity information, and wherein the deviation between the second analog signal and the second digital signal exceeding the second predefinable tolerance threshold value is indicative of a lack of authenticity of the second analog signal.

13. The sensor system as claimed in claim 12, wherein the determination apparatus is configured to calculate an average of a predefined number of data points of the first analog signal, calculate an average of a predefined number of data points of the first digital signal, and determine the deviation between the first analog signal and the first digital signal based on difference between the average of the predefined number of data points of the first analog signal and the average of the predefined number of data points of the first digital signal, and wherein the determination apparatus is configured to calculate an average of a predefined number of data points of the second analog signal, calculate an average of a predefined number of data points of the second digital signal, and determine the deviation between the second analog signal and the second digital signal based on difference between the average of the predefined number of data points of the second analog signal and the average of the predefined number of data points of the second digital signal.

14. The sensor system as claimed in claim 12, wherein the evaluation device is configured to, based on the first authenticity information and the second authenticity information, use the first measurement result extracted from the first analog signal or use the second measurement result extracted from the second analog signal.

15. A sensor system, comprising:

a sensor apparatus comprising:

a first sensor unit comprising a first sensor configured to measure a measurement parameter in order to obtain a first measurement result, wherein the first sensor unit is configured to generate an analog signal indicative of the first measurement result, and a second sensor unit comprising a second sensor configured to measure the measurement parameter in order to obtain a second measurement result, wherein the second sensor unit is configured to generate a digital signal indicative of at least part of the second measurement result;

a transmission apparatus configured to transmit the analog signal on a first signal transmission path to an evaluation device, and transmit the digital signal on a second signal transmission path to the evaluation device; and a protection apparatus, comprising a hardware processor, configured to protect the digital signal prior to transmission of the digital signal, wherein the second sensor unit is separate from the first sensor unit, and wherein the first sensor and the second sensor are structurally identical sensors.

16. The sensor system as claimed in claim 15, further comprising:

the evaluation device, the evaluation device comprising:

a reception apparatus configured to receive the analog signal and the digital signal, wherein the digital signal is received by the reception apparatus as a protected digital signal; and a determination apparatus configured to determine authenticity information indicative of an authenticity of the first measurement result based on the analog signal and the digital signal.

17. The sensor system as claimed in claim 16, wherein the determination apparatus is configured to determine whether a deviation between the analog signal and the digital signal exceeds a predefinable tolerance threshold value associated with possible manipulation as a basis of the authenticity information, and wherein the deviation between the analog signal and the digital signal exceeding the predefinable tolerance threshold value is indicative of a lack of authenticity of the analog signal.

18. The sensor system as claimed in claim 17, wherein the determination apparatus is configured to calculate an average of a predefined number of data points of the analog signal, calculate an average of a predefined number of data points of the digital signal, and determine the deviation between the analog signal and the digital signal based on difference between the average of the predefined number of data points of the analog signal and the average of the predefined number of data points of the digital signal.

19. An evaluation device, comprising:

a reception apparatus configured to:

receive, from a sensor device, a first analog signal indicative of a first measurement result of a measured measurement parameter and a first protected digital signal indicative of the first measurement result, the first analog signal and the first protected digital signal being associated with a first sensor, and receive, from the sensor device, a second analog signal indicative of a second measurement result of the measured measurement parameter and a second protected digital signal indicative of the second measurement result, the second analog signal and the second protected digital signal being associated with a second sensor that is different from the first sensor, wherein the first analog signal and the second analog signal are received simultaneously; and a determination apparatus configured to determine first authenticity information indicative of an authenticity of the first measurement result based on the first analog signal and the first protected digital signal, and determine second authenticity information indicative of an authenticity of the second measurement result based on the second analog signal and the second protected digital signal.

20. The evaluation device as claimed in claim 19, wherein the determination apparatus is configured to trigger an event based on the first authenticity information and the second authenticity information.

21. The evaluation device as claimed in claim 20, wherein the event triggered based on the first authenticity information and the second authenticity information is selected from a group comprising outputting a warning signal or a fault signal, triggering an emergency mode with reduced performance, triggering an operation using only the first protected digital signal without considering the first analog signal, increasing a data rate of the first protected digital signal, or classifying the first measurement result as authentic or non-authentic.

22. The evaluation device as claimed in claim 19, wherein the evaluation device is configured to use the first analog signal to extract the first measurement result and to use the first protected digital signal to inspect an integrity of the first analog signal.

23. The evaluation device as claimed in claim 19, comprising at least one of the following features:

wherein the determination apparatus is configured to decrypt the first protected digital signal and the second protected digital signal, which are protected by way of an encryption; or wherein the determination apparatus is configured to authenticate the first protected digital signal and the second protected digital signal, which are protected by way of authentication data.

24. The evaluation device as claimed in claim 19, wherein the determination apparatus is configured to determine whether a deviation between the first analog signal and the first protected digital signal exceeds a first predefinable tolerance threshold value associated with possible manipulation as a basis of the first authenticity information, wherein the deviation between the first analog signal and the first protected digital signal exceeding the first predefinable tolerance threshold value is indicative of a lack of authenticity of the first analog signal, wherein the determination apparatus is configured to determine whether a deviation between the second analog signal and the second protected digital signal exceeds a second predefinable tolerance threshold value associated with possible manipulation as a basis of the second authenticity information, and wherein the deviation between the second analog signal and the second protected digital signal exceeding the second predefinable tolerance threshold value is indicative of a lack of authenticity of the second analog signal.

25. The evaluation device as claimed in claim 24, wherein the evaluation device is configured to, based on the first authenticity information and the second authenticity information, use the first measurement result extracted from the first analog signal or use the second measurement result extracted from the second analog signal for a system controller.

26. The evaluation device as claimed in claim 24, wherein the determination apparatus is configured to calculate an average of a predefined number of data points of the first analog signal, calculate an average of a predefined number of data points of the first protected digital signal, and determine the deviation between the first analog signal and the first protected digital signal based on difference between the average of the predefined number of data points of the first analog signal and the average of the predefined number of data points of the first protected digital signal, and wherein the determination apparatus is configured to calculate an average of a predefined number of data points of the second analog signal, calculate an average of a predefined number of data points of the second protected digital signal, and determine the deviation between the second analog signal and the second protected digital signal based on difference between the average of the predefined number of data points of the second analog signal and the average of the predefined number of data points of the second protected digital signal.

* * * * *